(12) United States Patent
Tanaka et al.

(10) Patent No.: US 8,016,431 B2
(45) Date of Patent: Sep. 13, 2011

(54) IMAGE PROJECTION APPARATUS HAVING CONFIGURATION FOR DUSTPROFFING AND EFFICIENT COOLING

(75) Inventors: Hidetomo Tanaka, Utsunomiya (JP); Junichi Tanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 12/359,152

(22) Filed: Jan. 23, 2009

(65) Prior Publication Data

US 2009/0190100 A1 Jul. 30, 2009

(30) Foreign Application Priority Data

Jan. 24, 2008 (JP) ................................ 2008-013566

(51) Int. Cl.
G03B 21/16 (2006.01)
(52) U.S. Cl. ........................................................ 353/61
(58) Field of Classification Search ................ 353/57–61
See application file for complete search history.

(56) References Cited

U.S. PATENT DOCUMENTS

| 6,471,357 B1 | 10/2002 | Hara |
| 2005/0007558 A1 | 1/2005 | Shiraishi |
| 2005/0264766 A1* | 12/2005 | Morimoto et al. ............... 353/61 |
| 2007/0195282 A1* | 8/2007 | Takasuka ........................ 353/61 |
| 2007/0211220 A1* | 9/2007 | Kaneko ........................... 353/52 |
| 2007/0285623 A1* | 12/2007 | Kuraie ............................. 353/58 |
| 2009/0122270 A1* | 5/2009 | Lu .................................... 353/57 |

FOREIGN PATENT DOCUMENTS

| JP | 3490024 | 11/2000 |
| JP | 2002-090875 | 3/2002 |
| JP | 2003-107581 | 4/2003 |
| JP | 2005-017547 | 1/2005 |

* cited by examiner

*Primary Examiner* — Seung C Sohn
(74) *Attorney, Agent, or Firm* — Canon USA Inc IP Division (57) ABSTRACT

An image projection apparatus that illuminates an image forming element arranged downstream of the image forming element and configured to form an original image by using light form a light source, and projects light from the image forming element onto a projected screen includes a housing having an inlet port with a dust removal filter, a fan configured to draw air into the housing through the inlet port, a duct configured to lead the air drawn from the inlet port into a space that contains the image forming element, and a chamber provided between the inlet port and the duct, wherein a sectional area of the chamber is larger in a direction orthogonal to an inflow direction of air into the duct at a connection part between the chamber and the duct than a sectional area of the connection part.

13 Claims, 10 Drawing Sheets

IMAGE PROJECTION APPARATUS HAVING CONFIGURATION FOR DUSTPROFFING AND EFFICIENT COOLING

BACKGROUND OF THE INVENTION

1. Field of the Invention

The present invention relates to an image projection apparatus, such as a liquid crystal projector, and more particularly to an image projection apparatus having a cooling mechanism configured to cool the interior of the image projection apparatus by using air.

2. Description of the Related Art

A water-cooling method and a method of using a Peltier element are known as a cooling structure for the image projection apparatus, but many cooling structures use a less expensive air-cooling method that employs a fan than the foregoing methods.

However, the air-cooling method draws into the apparatus the dust from the outside of the apparatus as well as open air due to the fan's drawing force; the dust may adhere to surfaces of a liquid crystal panel (image forming element) or another optical element and appear in a projected image. In general, the image projection apparatus is provided with a dust removing filter at an inlet port for the open air, but a high flow velocity of the drawn air causes an invasion of the dust in the apparatus through the dust removal filter.

In order to prevent the invasion of the dust from the outside, Japanese Patent No. 3,490,024 discloses a method of cooling a heating element, such as a liquid crystal panel, by circulating the air in the apparatus.

However, in the cooling method disclosed in Japanese Patent No. 3,490,024, the air that circulates in the apparatus continuously takes away the heat from the heating element, its temperature rises with the passage of time, and the air cannot maintain a sufficient cooling effect. In this case, the cooling effect can improve by increasing the number of rotations of the fan, but the increased number of rotations of the fan increases the noise generated from the apparatus disadvantageously.

SUMMARY OF THE INVENTION

The present invention is directed to an image projection apparatus that can prevent adhesions of drawn dust to an image forming element or another optical element, and provide a high cooling efficiency.

An image projection apparatus according to one aspect of the present invention that illuminates an image forming element configured to form an original image by using light form a light source, and projects light from the image forming element onto a projected screen includes a housing having an inlet port including a dust removal filter, a fan arranged downstream of the image forming element and configured to draw air into the housing through the inlet port, a duct configured to lead the air drawn from the inlet port into a space that contains the image forming element, and a chamber provided between the inlet port and the duct, wherein a sectional area of the chamber is larger in a direction orthogonal to an inflow direction of air into the duct at a connection part between the chamber and the duct than a sectional area of the connection part.

An image projection apparatus according to another aspect of the present invention that illuminates an image forming element configured to form an original image by using light form a light source, and projects light from the image forming element onto a projected screen includes a housing having an inlet port including a dust removal filter, a fan arranged downstream of the image forming element and configured to draw air into the housing through the inlet port, a duct configured to lead the air drawn from the inlet port into a space that contains the image forming element, a chamber provided between the inlet port and the duct, and a resistance part provided between the inlet port and the duct, and configured to make uniform a flow velocity of the air by reducing a flow velocity of part of the air which passes the inlet port.

An image display system according to another aspect of the present invention includes the above image projection apparatus, and an image supply apparatus configured to supply image data to the image projection apparatus.

Further features of the present invention will become apparent from the following description of exemplary embodiments (with reference to the attached drawings).

DESCRIPTION OF THE EMBODIMENTS

Referring now to the accompanying drawings, a description will be given of an embodiment of the present invention.

Figure 1:
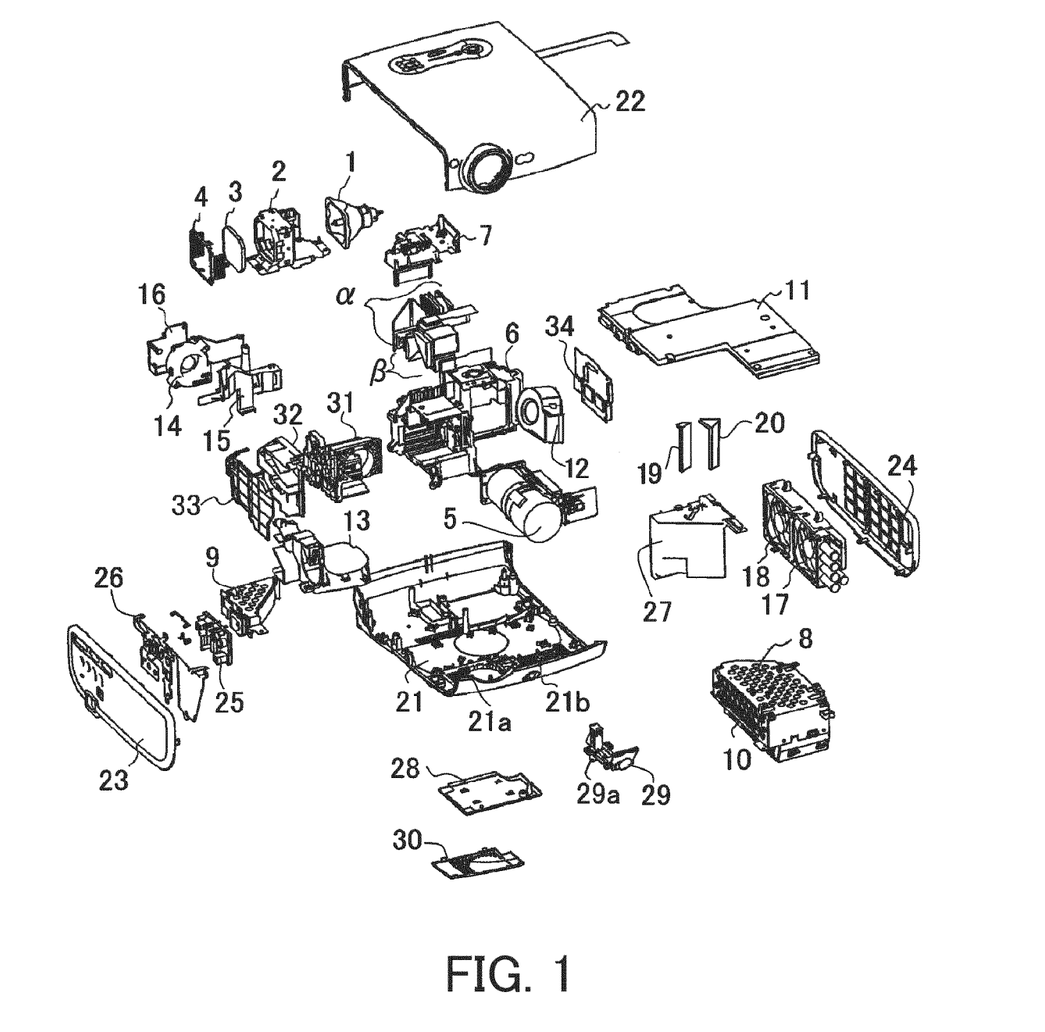
FIG. 1 is an exploded perspective view of a liquid crystal projector according to a first embodiment of the present invention.

FIG. 1 shows a structure of a liquid crystal projector (image projection apparatus) according to a first embodiment of the present invention.

In this figure, reference number 1 denotes a light source lamp (which will be simply referred to as a "lamp" hereinafter), and this embodiment uses a high-pressure mercury discharge lamp. The light source lamp 1 may use a discharge lamp other than the high-pressure mercury discharge lamp, such as a halogen lamp, a xenon lamp, and a metal halide lamp.

Reference number 2 denotes a lamp holder configured to hold the lamp 1. Reference number 3 denotes an explosion-proof glass. Reference number 4 denotes a glass press.

Reference character a denotes an illumination optical system configured to convert a luminous flux from the lamp 1 into a parallel luminous flux having a uniform brightness distribution. Reference character β denotes a color separation/synthesis optical system configured to color-separate the light from the illumination optical system α, to lead the light to reflective liquid crystal panels (image forming elements (not shown in FIG. 1) for three colors of RGB), and to color-synthesize the light from the liquid crystal panels.

Reference number 5 denotes a projection lens barrel configured to project the light (image) from the color separation/synthesis optical system β onto a screen (projected surface) (not shown). A projection optical system is housed in the projection lens barrel 5.

Reference number 6 denotes an optical box configured to house the lamp 1, the illumination optical system α, and the color separation/synthesis optical system β; the projection lens barrel 5 is fixed onto the optical box 6. The optical box 6 forms a space that contains the optical elements, such as the reflective liquid crystal panels, which will be described later.

Reference number 7 denotes an optical box lid that covers the optical box 6 while the optical box 6 houses the illumination optical system α and the color separation/synthesis optical system β.

Reference number 8 denotes a PFC power source unit configured to generate a DC power source from a commercial power source to each substrate, and reference number 9 denotes a power source filter. Reference number 10 denotes a ballast power source unit that cooperates with the PFC power source unit 8 and turns on the lamp 1.

Reference number 11 denotes a control substrate that controls driving of the liquid crystal panel and turning on of the lamp 1 by using the power from the PFC power source unit 8.

Reference number 12 denotes an optical system cooling fan configured to cool the optical element, such as a liquid crystal panel and a polarization plate, in the color separation/synthesis optical system β by drawing air from an inlet port 21a of a bottom panel of a case 21, which will be described later. Reference number 13 denotes a first RGB duct that leads a wind from the optical system cooling fin 12 to the optical system in the color separation/synthesis optical system β.

Reference number 14 denotes a lamp cooling fan configured to send a blowing wind to the lamp 1 and to cool the lamp 1. Reference number 15 denotes a first lamp duct configured to hold the lamp cooling fan 14 and to introduce the cooling wind to the lamp 1. Reference number 16 denotes a second lamp duct configured to hold the cooling fan 14 and to constitute a duct with the first lamp duct 15.

Reference number 17 denotes a power source cooling fan configured to draw air from an inlet port 21b provided in the bottom panel 21, circulates the wind in the PFC power source unit 8 and the ballast power source unit 10, and cools these components. Reference number 18 denotes an exhaust fan configured to exhaust the heated wind that has been sent from the lamp cooling fan 14 to the lamp 1 and cooled them, from an exhaust port formed in a second side plate 24, which will be described later.

The bottom panel 21 houses the lamp 1, the optical box 6, the PFC power source unit 8, the ballast power source unit 10, and the control substrate 11.

Reference number 22 is a top panel of the case configured to cover the bottom panel 21 while the bottom panel 21 houses the optical box 6.

Reference number 23 denotes a first side plate configured to close a side surface opening formed in the panels 21 and 22, in cooperation with a second side plate 24. The bottom panel 21 has the above inlet ports 21a and 21b, and the second side plate 24 has the above exhaust port. The bottom panel 21, the top panel 22, the first side plate 23, and the second side plate 24 form a housing of the projector.

Reference number 25 denotes an interface ("IF") substrate mounted with a connector to receive various types of signals, and reference number 26 denotes an IF reinforcing plate attached to the inside of the first side plate 23.

Reference number 27 denotes an exhaust duct configured to introduce the exhaust heat from the lamp 1 to the exhaust fan 18 and to prevent diffusions of the exhaust wind in the housing. The exhaust duct 27 holds exhaust louvers 19 and 20 each having a light shielding function so as to prevent a leakage of the light from the lamp 1 to the outside of the apparatus.

Reference number 28 denotes a lamp lid. The lamp lid 28 is detachably arranged on a bottom surface of the bottom panel 21, and fixed by a screw (not shown). Reference number 29 denotes a set adjustment leg. The set adjustment leg 29 is fixed onto the bottom panel 21, and a height of its leg part 29a is adjustable. An inclination angle of the projector can be adjusted by a height adjustment of the leg part 29a.

Reference number 30 denotes a RGB inhalation plate configured to hold a dust removal filter (see reference number 36 in FIGS. 7 and 8) attached to the inlet port 21a in the bottom panel 21.

Reference number 31 denotes a prism base configured to hold the color separation/synthesis optical system β. Reference number 32 denotes a box side cover having a duct shape part configured to lead the cooling wind from the optical system cooling fan 12 so as to cool the liquid crystal panel and the optical element in the color separation/synthesis optical system β. Reference number 33 denotes a second RGB duct configured to form the duct in cooperation with the box side cover 32.

Reference number 34 denotes a RGB substrate connected to the control substrate 11 and a flexible substrate that extends from a liquid crystal panel arranged in the color separation/synthesis optical system β.

Figure 2A:
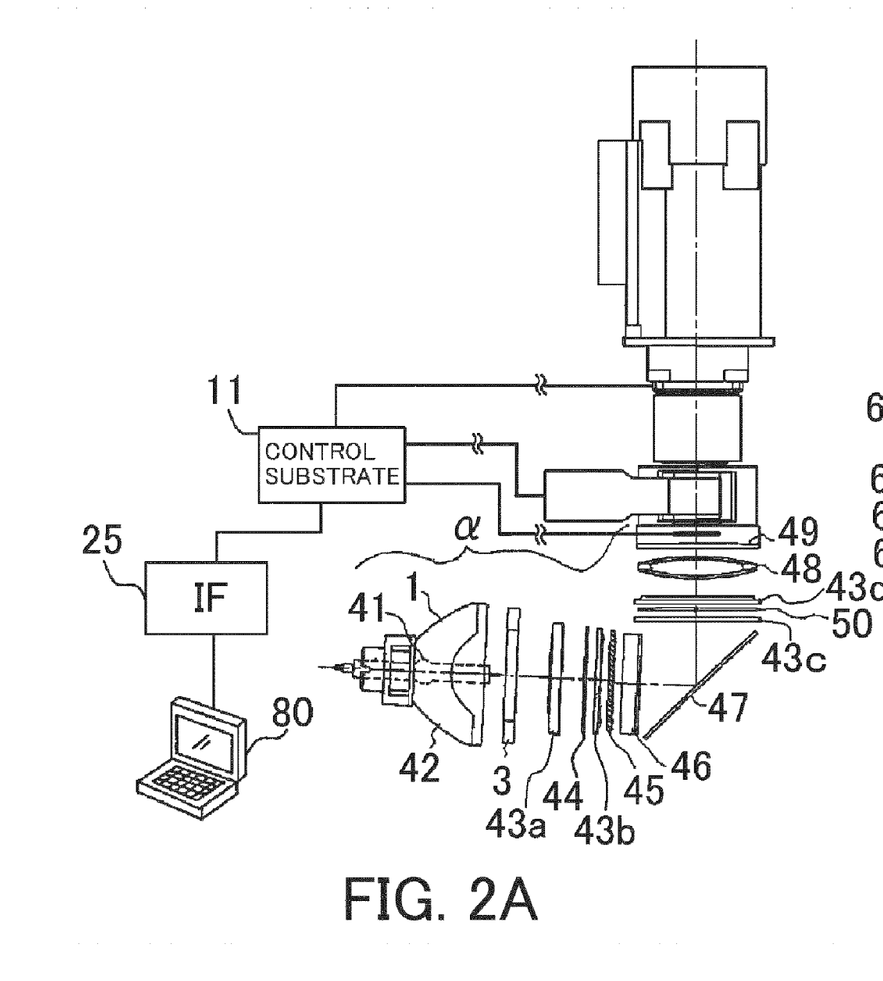
FIG. 2A shows a horizontal sectional view of an optical structure of the projector according to the first embodiment.
Figure 2B:
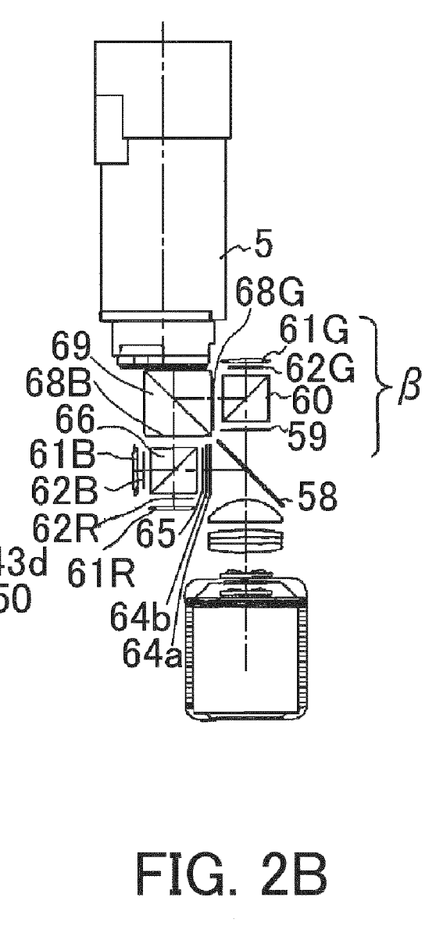
FIG. 2B shows a perpendicular sectional view of an optical structure of the projector according to the first embodiment.

Referring now to FIGS. 2A and 2B, a description will be given of an optical system that includes the above lamp 1, the illumination optical system α, the color separation/synthesis optical system β, and the projection lens barrel 5.

FIG. 2A is a horizontal section of the optical system, and FIG. 2B is a perpendicular section of the optical system.

In these figures, reference number 41 denotes a discharge light emitting tube configured to emit white light with a continuous spectrum (which will be simply referred to as a "light emitting tube" hereinafter). Reference number 42 denotes a reflector having a concave mirror configured to condense the light from the light emitting tube 41 onto a predetermined direction. The light emitting tube 41 and the reflector 42 constitute the light source lamp 1.

Reference number 43a denotes a first cylinder array which arranges a plurality of cylindrical lens cells each having a refractive index in the horizontal direction shown in FIG. 2A. Reference number 43b denotes a second cylinder array which arranges a plurality of cylindrical lens cells corresponding to individual lens cells in the first cylinder array 43a. Reference number 44 denotes an ultraviolet absorption filter, and reference number 45 denotes a polarization conversion element configured to convert non-polarized light into predetermined polarized light.

Reference number 46 denotes a front compressor that includes a cylindrical lens having a refractive index in the perpendicular direction shown in FIG. 2B. Reference number 47 denotes a mirror configured to deflect an optical axis from the lamp 1 by about 90° (more specifically 88°).

Reference number 43c is a third cylinder array that arranges a plurality of cylindrical lens cells each having a refractive index in the perpendicular direction. Reference number 43d is a fourth cylinder array having a plurality of cylindrical arrays corresponding to individual lens cells in the third cylinder array 43c.

Reference number 50 denotes a color filter that returns the color having a specific wavelength region to the lamp 1 so as to adjust the color coordinate to a predetermined value. Reference number 48 denotes a condenser lens. Reference number 49 denotes a rear compressor that includes a cylindrical lens having a refractive index in the perpendicular direction. The above components constitute the illumination optical system α.

Reference number 58 denotes a dichroic mirror configured to reflect light having wavelength regions of blue (B: for example, 430 to 495 nm) and red (R: for example, 590 to 650 nm), and to transmit light having a wavelength region of green (G: 505 to 580 nm). Reference number 59 denotes a G-use incident side polarization plate that is made by adhering a polarization element to a transparent substrate, and transmits only the P-polarized light. Reference number 60 denotes a first polarization beam splitter configured to transmit the P-polarized light and to reflect the S-polarized light through the polarization separation surface that is made of a multi-layer film.

Reference numbers 61R, 61G, and 61B are a red-use reflective liquid crystal panel, a green-use reflective liquid crystal panel, a blue-use reflective liquid crystal panel each configured to reflect the incident light and to serve as a light modulation element (or image forming element) for image modulations. Reference numbers 62R, 62G, and 62B are a red-use quarter waveplate, a green-use quarter waveplate, and a blue-use quarter waveplate.

Reference number 64a denotes a trimming filter configured to return orange light to the lamp 1 so as to improve the color purity of the R light. Reference number 64b denotes a RB-use incident side polarization plate made by adhering a polarization element to a transparent substrate, and configured to transmit only the P-polarized light.

Reference number 65 denotes a color selective phase plate that converts a polarization direction of the R light by 90°, and maintains a polarization direction of the B light. Reference number 66 denotes a second polarization beam splitter configured to transmit the P-polarized light and to reflect the S-polarized light on the polarization separation surface.

Reference number 68B denotes a B-use exit side polarization plate (polarization element) configured to rectify only the S-polarized light component in the B light. Reference number 68G is a G-use exit side polarization plate configured to transmit only the S-polarized light component in the G light. Reference number 69 denotes a dichroic prism configured to transmit the R light and B light and to reflect the G light.

The above components including the dichroic mirror 58 to the dichroic prism 69 constitute the color separation/synthesis optical system β.

In this embodiment, the polarization conversion element 45 converts the P-polarized light into the S-polarized light, but the "P-polarized light" and the "S-polarized light," as used herein, are defined on the basis of the light polarization direction in the polarization conversion element 45. On the other hand, that the light incident upon the dichroic mirror 58 is assumed to be the P-polarized light by considering the polarization directions at the first and second polarization beam splitters 60 and 66 to be a reference. In other words, this embodiment defines the light exited from the polarization conversion element 45 as the S-polarized light but defines as the P-polarized light the same S-polarized light when it is incident upon the dichroic mirror 58.

Next follows a description of an optical operation. The light emitted from the light emitting tube 41 is condensed onto a predetermined direction by the reflector 42. The reflector 42 has a paraboloidal concave mirror, and the light from the focus position of the paraboloid becomes a luminous flux parallel to the symmetrical axis of the paraboloid. Since the light source from the light emitting tube 41 is not an ideal point light source but has a finite size, the condensed luminous flux contains many light components that are unparallel to the symmetrical axis of the paraboloid. The luminous flux is incident upon the first cylinder array 43a. The light flux incident upon the first cylinder array 43a is divided into a plurality of luminous fluxes corresponding to the number of cylinder lens cells, condensed, and become a plurality of band-shaped luminous fluxes that are arranged in the perpendicular direction. The plurality of split luminous fluxes form a plurality of light source images near the polarization conversion element 45 via the ultraviolet absorption filter 44 and the second cylinder array 43b.

The polarization conversion element 45 has a polarization separation surface, a reflection surface, and a half waveplate. A plurality of luminous fluxes are incident upon the polarization separation surface corresponding to their rows, and are divided into the transmitting P-polarized light component and the reflected S-polarized light component. The reflected S-polarized light component is reflected on the reflection surface, and exited in the same direction as the P-polarized light component. On the other hand, the P-polarized light component that has transmitted the polarization separation surface transmits the half waveplate, and is converted into the same polarization component as the S-polarized light component. Thus, a plurality luminous fluxes having the same polarization direction are emitted.

A plurality of polarization-converted luminous fluxes exit the polarization conversion element 45, then are compressed by the front compressor 46, are reflected on the mirror 47 by an angle of 88°, and are incident upon the third cylinder array 43c.

The luminous flux incident upon the third cylinder array 43c is split into a plurality of luminous fluxes corresponding to the number of cylinder lens cells, condensed, and converted into a plurality of band-shaped luminous fluxes that are arranged in the horizontal direction. The plural split luminous fluxes are incident upon the rear compressor 49 via the fourth cylinder array 43d and the condenser lens 48.

Due to the optical operations of the front compressor 46, the condenser lens 48, and the rear compressor 49, rectangular images formed by the plural luminous fluxes overlap each other, and form a rectangular illumination area having a uniform brightness. The reflective liquid crystal panels 61R, 61G, and 61B are arranged in this illumination area.

The light that has been converted into the S-polarized light by the polarization conversion element 45 is incident upon the dichroic mirror 58. A description will now be given of an optical path of the G light that has passed the dichroic mirror 58.

The G light that has transmitted the dichroic mirror 58 is incident upon the incident side polarization plate 59. The G light has become the P-polarized light (or S-polarized light when the polarization conversion element 45 is used as a reference) even after separated by the dichroic mirror 58. The G light is exited from the incident side polarization plate 59, then is incident as the P-polarized light upon the first polarization beam splitter 60, transmits the polarization separation surface, and goes to the G-use reflective liquid crystal panel 61G.

An image supply apparatus 80, such as a personal computer, a DVD player, and a TV tuner, is connected to the IF substrate 25 of the projector. The control substrate 11 drives the reflective liquid crystal panels 61R, 61G, and 61B based on the image information input from the image supply apparatus 80, and forms an original image for each color. Thereby, the luminous flux incident upon each reflective liquid crystal panel is reflected and (image-)modulated in accordance with the original image. The image supply apparatus 80 and the projector constitute an image display system.

The G-use reflective liquid crystal panel 61G image-modulates and reflects the G-light. The P-polarized light component in the image-modulated G light again transmits the polarization separation surface of the first polarization beam splitter 60, is returned to the light source side, and is removed from the projection light. On the other hand, the S-polarized light component in the image-modulated G light is reflected on the polarization separation surface of the first separation beam splitter 60, and goes as the projection light to the dichroic prism 69.

In this case, when all the polarized light component are converted into the P-polarized light component (or in a black display state), a slow axis of a quarter waveplate 62G is adjusted to a predetermined direction which is provided between the first polarization beam splitter 60 and the G-use reflective liquid crystal panel 61G. Thereby, the influence of a disturbance of the polarization state that occurs in the first polarization beam splitter 60 and the G-use reflective liquid crystal panel 61G.

The G light emitted from the first polarization beam splitter 60 is incident as the S-polarization light upon the dichroic prism 69, is reflected on the dichroic film surface of the dichroic prism 69, and goes to the projection lens barrel 5.

On the other hand, the R light and the B light reflected on the dichroic mirror 58 are incident upon the trimming filter 64*a*. Each of the R light and the B light is the P-polarized light even after separated by the dichroic mirror 58. After the orange light component of each of the R light and the B light is cut by the trimming filter 64*a*, the R light and the B light transmit the incident side polarization plate 64*b*, and are incident upon the color selective phase plate 65.

The color selective phase plate 65 serve to rotate a polarization direction of only the R light by 90°, and thereby the R light is incident as the S-polarized light and the B light is incident as the P-polarized light upon the second polarization beam splitter 66.

The R light that is incident as the S-polarized light upon the second polarization beam splitter 66 is reflected on the polarization separation surface of the second polarization beam splitter 66, and goes to the R-use reflective liquid crystal panel 61R. In addition, the B light incident as the P-polarized light upon the second polarization beam splitter 66 transmits the polarization separation surface of the second polarization beam splitter 66, and goes to the B-use reflective liquid crystal panel 61B.

The R light incident upon the R-use reflective liquid crystal panel 61R is image-modulated and reflected. The S-polarized light component in the image-modulated R light is again reflected on the polarization separation surface of the second polarization beam splitter 66, and returned to the light source side, and removed from the projection light. On the other hand, the P-polarized light component in the image-modulated R light transmits the polarization separation surface of the second polarization beam splitter 66, and goes to the dichroic prism 69 as the projection light.

In addition, the B light incident upon the B-use reflective liquid crystal panel 61B is image-modulated and reflected. The P-polarized light component in the image-modulated B light again transmits the polarization separation surface of the second polarization beam splitter 66, is returned to the light source side, and is removed from the projection light. On the other hand, the S-polarized light component in the image-modulated B light is reflected on the polarization separation surface of the second beam splitter 66, and goes as projection light to the dichroic prism 69.

At this time, by adjusting the slow axes of the quarter waveplates 62R and 62B provided between the second polarization beam splitter 66 and the R-use and B-use reflective liquid crystal panels 61R and 61B, the black display states of the R light and the B light can be adjusted, similar to the G light.

Thus, the R light and the B light synthesized into one luminous flux and exited from the second polarization beam splitter 66 are detected by the exit side polarization plate 68B and incident upon the dichroic prism 69. In addition, the R light transmits as the P-polarization light the exit side polarization plate 68B, and is incident upon the dichroic prism 69.

By the detection at the exit side polarization plate 68B, the B light becomes light from which an invalid component is cut, which is generated when the B light passes the second polarization beam splitter 66, the B-use reflective liquid crystal panel 61B, and the quarter waveplate 62B.

The R light and the B light that are incident upon the dichroic prism 69 transmit the dichroic film surface, is synthesized with the G light reflected on the dichroic film surface, and goes to the projection lens 5.

The synthesized R light, G light, and B light are enlarged and projected on the projected surface, such as a screen, by the projection lens 5.

The above optical path is an optical path when the reflective liquid crystal panel is in the white display state. Next follows a description when the reflective liquid crystal panel is in the black display state.

A description will now be given of an optical path of the G light. The P-polarized light of the G light that has transmitted the dichroic mirror 58 is incident upon the incident side polarization plate 59, then incident upon the first polarization beam splitter 60, transmits its polarization separation surface, and goes to the G-use reflective liquid crystal panel 61G. However, the reflective liquid crystal panel 61G is in the black display state, and thus the G light is reflected without undergoing the image modulation. Therefore, even after reflected on the reflective liquid crystal panel 61G, the G light remains P-polarized. Therefore, the G light again transmits the polarization separation surface of the first polarization beam splitter 60, transmits the incident side polarization plate 59, is returned to the light source side, and is removed from the projection light.

Next follows a description of optical paths of the R light and the B light. The P-polarized light of each the R light and the B light reflected on the dichroic mirror 58 is incident upon the incident side polarization plate 64*b*. After emitted from the incident side polarization plate 64*b*, the G light is incident upon the color selective phase plate 65. Since the color selective phase plate 65 serves to rotate the polarization direction of only the R light by 90°, the R light is incident as the S-polarized light and the B light is incident as P-polarized light upon the second polarization beam splitter 66.

The R light that is incident as the S-polarized light upon the second polarization beam splitter 66 is reflected on its polarization separation surface, and goes to the R-use reflective liquid crystal panel 61R. In addition, the B light that is incident as the P-polarized light upon the second polarization beam splitter 66 transmits its polarization separation surface, and goes to the B-use reflective liquid crystal panel 61B.

Since the R-use reflective liquid crystal panel 61R is in the black display state, the R light incident upon the R-use reflective liquid crystal panel 61R is reflected without undergoing the image modulation. Therefore, after reflected on the R-use reflective liquid crystal panel 61R, the R light remains S-polarized. Therefore, the R light is again reflected on the polarization separation surface of the second polarization beam splitter 66, transmits the incident side polarization plate 64b, is returned to the light source side, and is removed from the projection light. Thereby, the black display is made.

On the other hand, the B light incident upon the B-use reflective liquid crystal panel 61B is reflected without undergoing image modulation, since the B-use reflective liquid crystal panel 61B is in the black display state. Therefore, after reflected on the B-use reflective liquid crystal panel 61B, the B light remains P-polarized. Therefore, the B light again transmits the polarization separation surface of the second polarization beam splitter 66, is converted into the P-polarized light by the color selective phase plate 65, transmits the incident side polarization plate 64b, is returned to the light source side, and is removed from the projection light.

Figure 3:
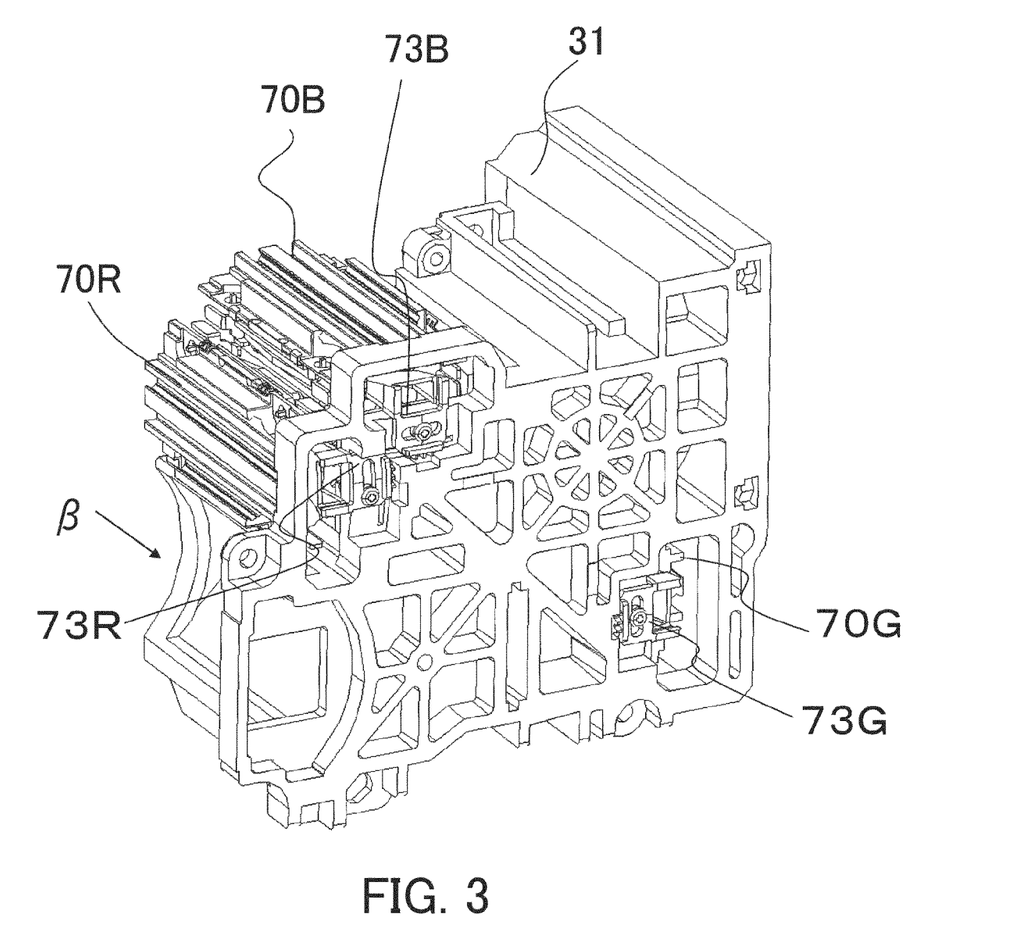
FIG. 3 is a perspective view showing a prism unit in the projector according to the first embodiment.
Figure 4:
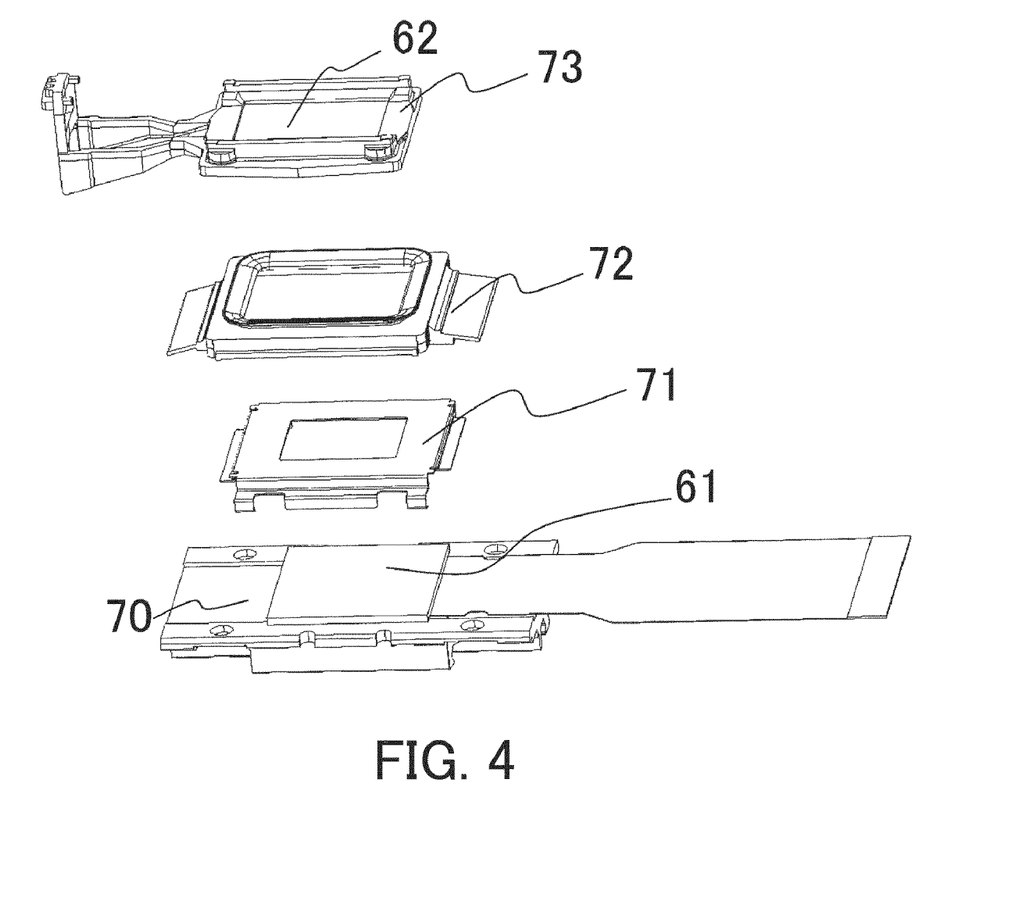
FIG. 4 is an exploded perspective view showing a structure around the liquid crystal panel in the projector in the first embodiment.
Figure 5:
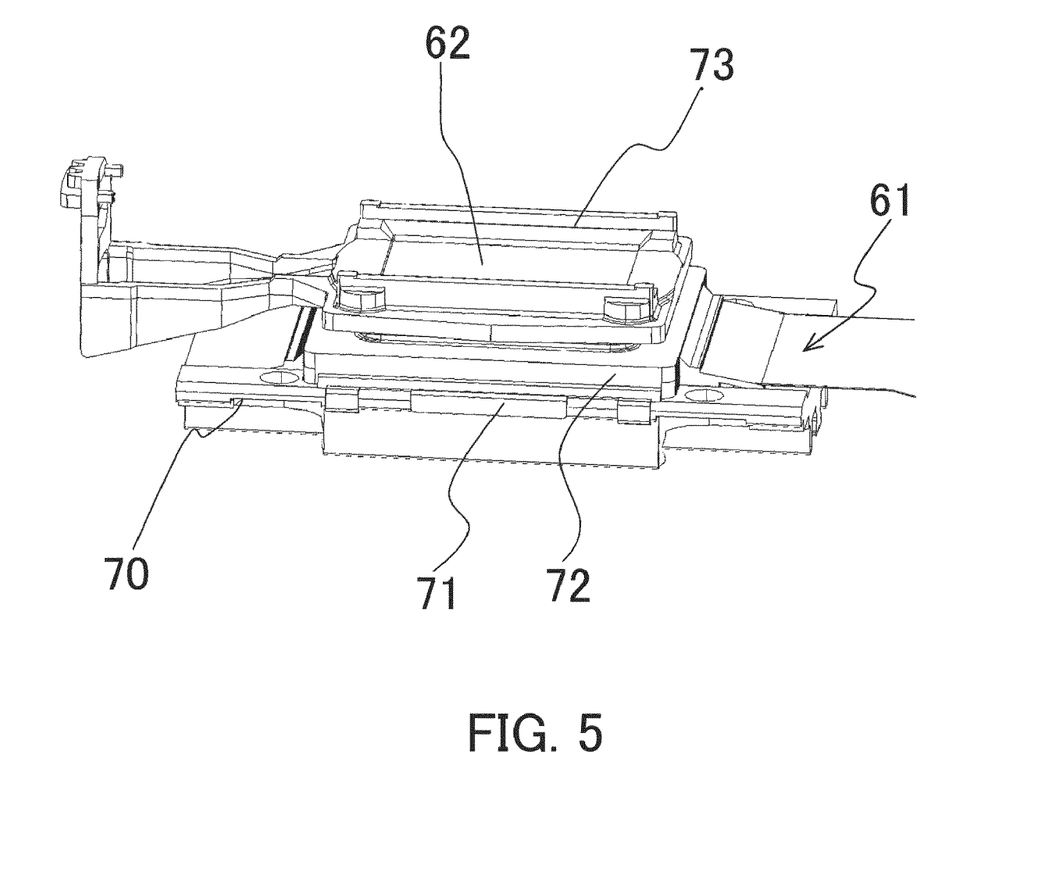
FIG. 5 is a perspective view showing a structure around the above liquid crystal panel.

Referring now to FIGS. 3 to 5, a description will be given of a structure around the color separation/synthesis optical system β. In the following description, the reflective liquid crystal panels 61R, 61G, and 61B are designated by 61, and quarter waveplates 62R, 62G, and 62B are designated by 62.

FIG. 3 shows a positional relationship among the reflective liquid crystal panels 61 for the R light, the G light, and the B light in the color separation/synthesis optical system β. In FIG. 3, a prism base 31 holds the color separation/synthesis optical system β, as described above. Reference numbers 70R, 70G, and 70B denote heat sinks configured to hold the reflective liquid crystal panels 61 for the R light, the G light, and the B light (see FIG. 4), and reference numbers 73R, 73G, and 73B denote quarter waveplate holders configured to hold the quarter waveplate 62 for the R light, the G light, and the B light (see FIG. 4).

FIG. 4 shows an exploded view of a structure around the reflective liquid crystal panel 61 common to three RGB colors. FIG. 5 shows an assembly state of the components shown in FIG. 4.

In these figures, reference number 70 denotes the above heat sink (70R, 70G, or 70B), and reference number 73 denotes the quarter waveplate holder (73R, 73G, or 73B).

Reference number 71 denotes a panel mask, and reference number 72 denotes a rubber shield that covers the peripheral of the light incident/exit surfaces of the reflective liquid crystal panel 61 so as to prevent adhesions of the dust to the light incident/exit surfaces.

In the state of FIG. 5, the heat sink 70 covers a back surface of the reflective liquid crystal panel 61. In addition, side surfaces of the reflective liquid crystal panel 61 are enclosed by a side surface part of the panel mask 71. Moreover, the light incident/exit surfaces of the reflective liquid crystal panel 61 is covered by the quarter waveplate 62 and the quarter waveplate holder 73, and the remaining clearance is enclosed by the rubber shield 72.

This structure can form an enclosed space that prevent infiltrations of the dust between the quarter waveplate 62 the reflective liquid crystal panel 61. Therefore, a high dustproof performance can be obtained. However, on the other hand, the heat radiation characteristic of the quarter waveplate 62 and the reflective liquid crystal panel 61 lowers.

In particular, the quarter waveplate 62 is susceptible to heat in the reflective liquid crystal panel 61 when the quarter waveplate 62 is made of a liquid crystal, a rubbing film, and a polycarbonate material as an organic matter.

Accordingly, this embodiment provides the optical system cooling fan 12 near the reflective liquid crystal panel 61 and the quarter waveplate 62. The optical system cooling fan 12 draws the air from the interior of the optical box 6 (space that contains the reflective liquid crystal panel 61), and cools the reflective liquid crystal panel 61 and the quarter waveplate 62. This is because the wind velocity of the cooling wind current that occurs around the reflective liquid crystal panel 61 and the quarter waveplate 62 due to the drawing is higher than the wind velocity when the cooling wind is blown to the reflective liquid crystal panel 61 and the quarter waveplate 62, and this configuration is advantageous to cool these components.

Figure 6:
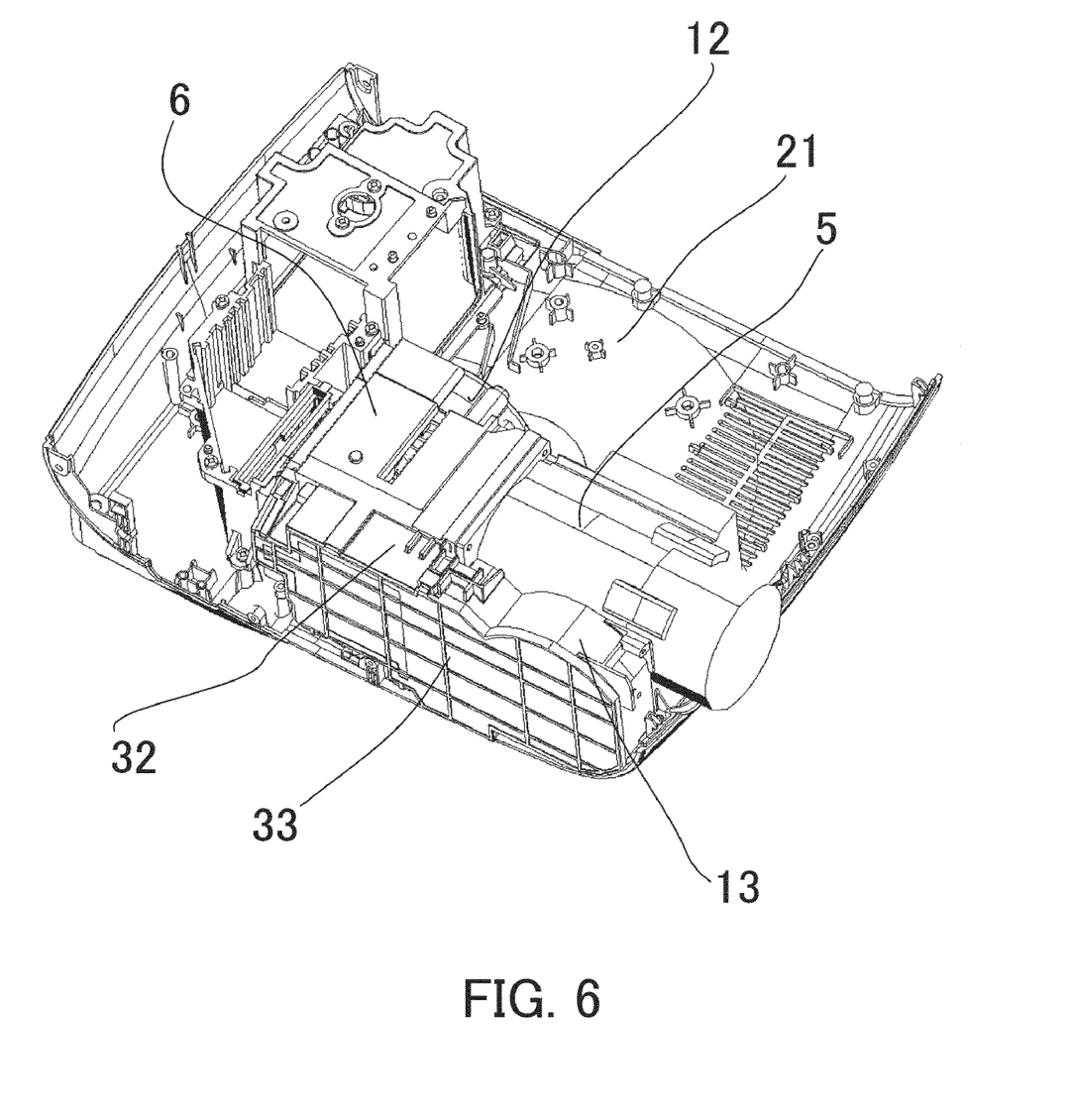
FIG. 6 is a perspective view showing a cooling structure in the projector according to the first embodiment.
Figure 7:
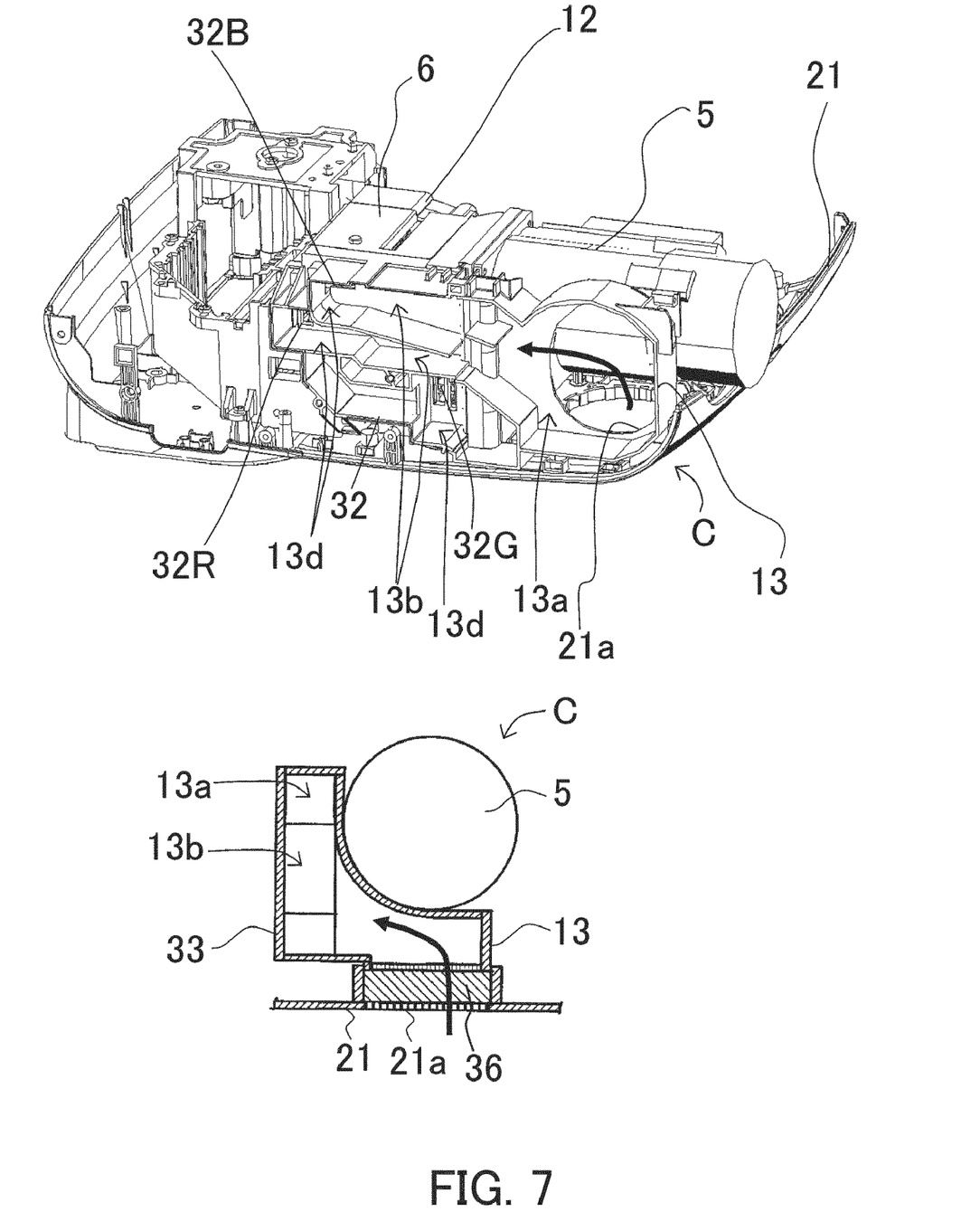
FIG. 7 shows a perspective view and a partially sectional view of the cooling structure.
Figure 8:
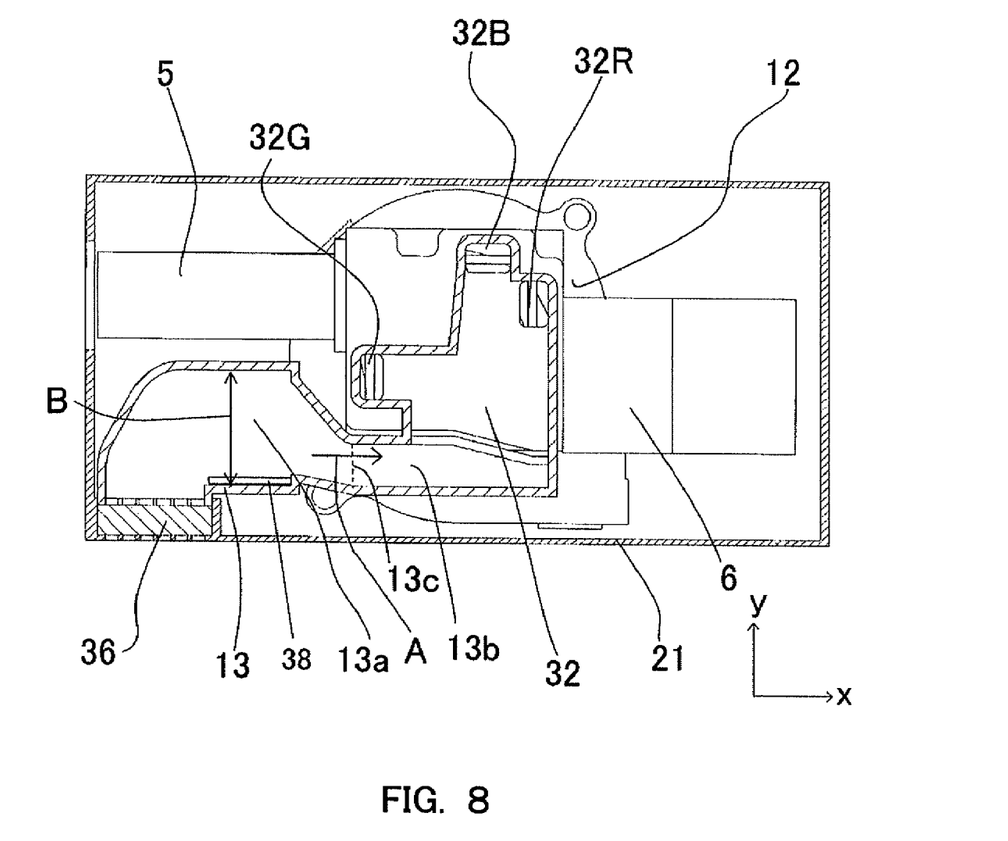
FIG. 8 is a schematic sectional view of the cooling structure.

Referring to FIGS. 6 to 8, a detailed description will be given of a cooling structure of the reflective liquid crystal panel 61 and the quarter waveplate 62.

FIG. 6 shows the bottom panel 21 to which the optical box 6 is attached. The optical system cooling fan 12 is provided near the reflective liquid crystal panel 61 and the quarter plate 62. The optical system cooling fan 12 is attached to the optical box 6 closely. This is because the cooling wind current can occur due to the drawing force of the optical system cooling fan (that is a sirocco fan in this embodiment) 12, and the cooling wind velocity of the drawing system is more likely to differ according to the closeness to the cooling object than the blowing system.

In addition, in order to introduce the open air to the interior of the optical box 6 that houses the color separation/synthesis optical system β that includes the reflective liquid crystal panel 61 and the quarter waveplate 62, the first RGB duct 13 and the box side cover 32 are attached to the bottom panel 21. Moreover, the second RGB duct 33 is attached to the first RGB duct 13 and the box side cover 32 in order to close the front openings of the first RGB duct 13 and the box side cover 32 in the figure.

FIG. 7 shows a cooling wind channel formed by the first RGB duct 13 and the box side cover 32, from which the second RGB duct 33 is removed. Moreover, the lower right view in FIG. 7 is a schematic section of a C part shown in FIG. 7 viewed from the optical-axis direction of the projection lens barrel 5. In this lower right view, 36 denotes is the above dust removal filter, which is provided to the inlet port 21a so as to cover the inside of the inlet port 21a of the bottom panel 21.

In FIG. 7, when the optical system cooling fan 12 is driven, the air is drawn from the optical box 6 and the interior of the optical box 6 becomes a low pressure; the air is drawn into the optical box 6 via the openings 32G, 32B, and 32R each having a small sectional area formed in the box side cover 32. Thereby, a space (referred to as a "duct" hereinafter) 13b formed by the box side cover 32 and the second RGB duct 33 becomes a low pressure. Moreover, the space (referred to as a "chamber" hereinafter) formed by the first and second RGB ducts 13 and 33 becomes a low pressure, and the open air (air) is taken in through the inlet port 21a (the dust removal filter 36).

Due to this drawing, the air taken in from the inlet port 21a (shown by a thick arrow in FIG. 7) flows in the duct 13b through the chamber 13a. Moreover, the air flows in the optical box 6 via the openings 32G, 32B, and 32R through the duct 13b to cool the optical elements, such as the reflective liquid crystal panel 61 and the quarter waveplate 62, is drawn in the optical system cooling fan 12, and is exhausted to the outside of the housing.

FIG. 8 schematically shows a sectional area relationship between the chamber 13a formed between the inlet port 21a and the duct 13b and the duct 13b. Reference number 13c in FIG. 8 denotes a connection part between the chamber 13a and the duct 13b (such as a connection part between the first RGB duct 13 and the box side cover 32).

The opening area of the inlet port 21a is set large enough to take in a sufficient amount of open air. Therefore, the flow velocity of the open air at the inlet port 21a is not high and more dust is less likely to be attracted. More dust attracted from the inlet port 21a is removed by the dust removal filter 36. However, there can also be the dust that passes the dust removal filter 36.

The chamber 13a is provided adjacent to the inlet port 21a and the dust removal filter 36, and has a large space. More specifically, the sectional area of the chamber 13a at the connection part 13c between the chamber 13a and the duct 13b in a direction (arrow B direction: referred to as a "B direction" hereinafter) orthogonal to the inflow direction of the air into the duct 13b (arrow A direction) is set larger than the sectional area of the connection part 13c. When the air flows in the chamber 13a having a large space, the flow velocity further decreases.

This is because the inlet port 21a has an apparently large opening area (sectional area) but has a plurality of ribs that cross the inlet port 21a so as to hold the dust removal filter 36 and thus reduce the actual opening area. On the other hand, the chamber 13a is a simply large space and has a large effective sectional area in the B direction; thereby, the flow velocity of the air from the inlet port 21a (dust removal filter 36) can be reduced.

The air that has a reduced flow velocity at the chamber 13a then flows in the duct 13b. When a sectional area of the duct 13b is set small in the B direction, the wind channel that leads the air to the predetermined area is formed. The duct 13b is connected to the openings 32G, 32B, and 32R while its sectional area decreases in the B direction. As shown in FIG. 7, there is a bent portion 13d that introduces the air into the optical box 6 through the openings 32G, 32B, and 32R in front of the openings 32G, 32B, and 32R of the duct 13b.

The duct 13b is connected to the optical box 6 in the long side direction of the reflective liquid crystal panel 61 through the openings 32G, 32B, and 32R.

The opening areas (sectional areas) of the openings 32G, 32B, and 32R are set as small as possible, but without causing excessively large air resistance. This is because the cooling capacity improves when the flow velocity of the air that touches the cooling object is set as large as possible. Since the air that flows as the cooling wind in the duct 13b can maintain a high flow velocity even after it is taken in the optical box 6, it is advantageous to reduce the opening areas of the openings 32G, 32B, and 32R.

Thus, this embodiment provides the chamber 13a having a large space between the inlet port 21a as an open air taking part and the duct 13b, and once lowers a flow velocity of the inflow air that has passed the inlet port 21a and the dust removal filter 36. Thereby, most of the dust that has passed the dust removal filter 36 is stalled in the chamber 13b, is limited in the chamber 13b, and prevents the infiltrations of the duct 13b.

The air from the chamber 13a to the duct 13b having a smaller sectional area than that of the chamber 13a accelerates its flow velocity, and flows in the optical box 6 through the openings 32G, 32B, and 32R. The air that flows in the optical box 6 flows around the optical elements, such as the reflective liquid crystal panel 61 and the quarter waveplate 62, at a high speed, and efficiently cools these optical elements.

The dust that stalls in the chamber 13a drops toward the bottom surface of the chamber 13a. Therefore, as shown in FIG. 8, when a dust capturing member 38, such as an adhesive and a charged sheet, is provided on the bottom surface of the chamber 13a, the dust can be surely prevented from infiltrating into the duct 13b.

As described above, the dust that infiltrates in the housing through the inlet port 21a is primarily captured by the dust removal filter 36, and secondarily captured by the chamber 13a as a result of the stall and fall. Moreover, the dust that infiltrates in the duct 13b collides with the wall surface of the bent portion 13d provided near the openings 32R, 32G, and 32B in the duct 13b, and is attracted and adhered to the wall surface as tertiary captures due to the electrostatic force and the intermolecular force that act between the wall surface and the dust. Therefore, even when the dust infiltrates in the optical box 6, the dust is very fine and its amount is small; due to the air that flows at a high flow velocity in the optical box 6 and the optical system cooling fan 12, the dust is highly likely to be exhaust to the outside of the optical box 6.

In addition, even if this small dust adheres to the quarter waveplate 62, the projection optical system is in the sufficient defocus state relative to the quarter waveplate 62 and an image of the dust cannot appear in a projected image on the screen.

Next follows a description of a design example of this embodiment. An effective sectional area of the inlet port 21a is small because of a plurality of ribs configured to hold the dust removal filter 36, and it is assumed that the flow velocity of the inflow air from the inlet port 21a is about 0.6 m/s. This flow velocity enables only floating dust near the inlet port 21a to be taken in with the air from the inlet port 21a.

The flow velocity of the air that is passing the dust removal filter 36 is about 1.0 m/s, on the assumption that an effective sectional area of the dust removal filter 36 is smaller by about 30% than an effective sectional area of the inlet port 21a.

Under this condition, the flow velocity of the air in the chamber 13a having a large sectional area may be set equal to or smaller than 0.3 m/s. This is close to a dead calm, and the dust is unlikely to flow to the duct 13b.

The duct 13b may be set to have a sectional area that is equal to or smaller than half the maximum sectional area of the chamber 13a. In other words, the maximum sectional area of the chamber 13a in the B direction may be set twice as large as the sectional area at the connection part 13c between the duct 13b and the chamber 13a in the B direction. Thereby, the flow velocity of the air in the duct 13b becomes 0.7 m/s to 1.0 m/s.

The duct that has infiltrated in the duct 13b collides with the wall surface when passing the bent portion of the duct 13a, and adheres to the wall surface due to the electrostatic force and the intermolecular force that act between the wall surface and the dust. The flow velocity of about 0.7 m/s to about 1.0 m/s has difficulties to separate the dust, and it is consequently conceivable that little dust infiltrates in the optical box 6.

The flow velocity of the air that passes the duct 13b and infiltrates in the optical box 6 may be set as high as 2.0 m/s to 2.5 m/s. In this case, the total sectional area of the openings 32G, 32B, and 32R may be set about fifth as small as the maximum sectional area of the chamber 13a.

A high-speed air current in the optical box 6 serves to efficiently cool the optical elements, such as the reflective liquid crystal panel 61 and the quarter waveplate 62, and compulsorily remove the dust that has infiltrated in the optical box 6.

This embodiment has a problem in that the dust particularly adheres to the surface of the quarter waveplate 62. However, the air that flows on the surface of the quarter waveplate 62 is made in a laminar flow state so that the dust is less likely to adhere to the surface of the quarter waveplate 62, by making plane the surface of the quarter waveplate 62 and by removing a rough part near the surface. The dust that can adhere to the surface of the quarter waveplate 62 has an unrecognized size of 0.005 mm or smaller on the screen.

Since this embodiment provides the chamber 13a between the inlet port 21a and the duct 13b, the flow velocity of the air that is drawn from the inlet port 21a can be made lower than the flow velocity in the duct 13b. Thereby, an amount of dust that passes the dust removal filter 36 can be reduced, and the dust that has passed the dust removal filter 36 can be limited in the chamber 13a. Hence, a realized projector can have a high dustproof characteristic and a cooling characteristic.

In addition, the optical system cooling fan 12 inhales downstream the optical box 6 and thus is necessarily arranged in the housing; since it is configured to take in the open air, it can be driven at a low rotational speed. Therefore, it is advantageous to the noise reduction of the projector.

Figure 9:
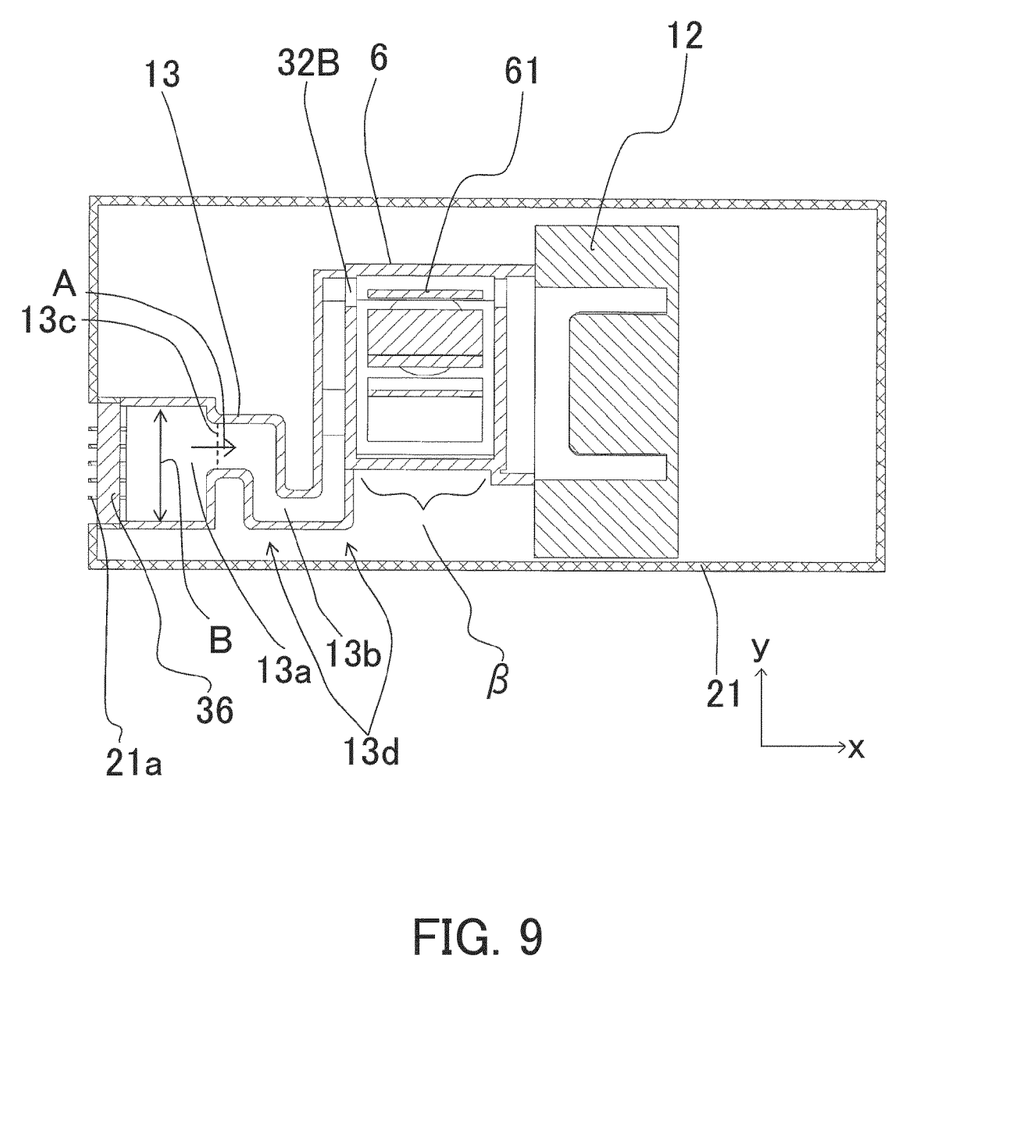
FIG. 9 is a schematic view of a cooling structure in a projector according to a second embodiment of the present invention.

FIG. 9 schematically shows a sectional area relationship between the chamber 13a and the duct 13b in the B direction in a projector according to the second embodiment of the present invention. The cooling structure of this embodiment has the same basic structure as that of the first embodiment. Therefore, those elements in this embodiment, which are common or have the common functions to the first embodiment, are designated by the same reference numerals of the first embodiment.

In this embodiment, the inlet port 21a is provided in a side surface of the housing.

Even in this embodiment, similar to the first embodiment, the chamber 13a is provided adjacent to the inlet port 21a and the dust removal filter 36 (or between the inlet port 21a and the duct 13b), and has a large space. More specifically, the sectional area of the chamber 13a at the connection part 13c between the chamber 13a and the duct 13b in the B direction orthogonal to the inflow direction to the duct 13b of the air (the arrow A direction) is set larger than the sectional area of the connection part 13c. The maximum sectional area of the chamber 13a can be set twice as large as the sectional area of the connection part 13c.

Therefore, when the air flows in the chamber 13a, as described for the first embodiment, the flow velocity becomes lower than the flow velocity of the air that passes the inlet port 21a and the dust removal filter 36. Therefore, most of the dust that has passed the dust removal filter 36 is limited in the chamber 13a, and prevents the infiltrations of the duct 13b.

The air whose flow velocity has reduced at the chamber 13a then flows in the duct 13b. Since the sectional area of the duct 13b in the B direction is smaller than the sectional area of the chamber 13a in the B direction, the flow velocity of the air that flows in the duct 13b is higher than the flow velocity in the chamber 13a. The air in the duct 13b flows in the optical box 6 through the openings 32G, 32B, and 32R (although only the opening 32B is shown in the drawing). The duct 13b is provided with a plurality of bent portions 13d, and enables the dust that has entered the duct 13b to adhere to the wall surface of the bent portion 13d.

The air that flows in the optical box 6 flows around the optical elements, such as a reflective liquid crystal panel 61 and the quarter waveplate 62, at a high speed, efficiently cools these optical elements, and is exhausted to the outside of the optical box 6 through the optical system cooling fan 12.

Thus, even when the inlet port 21a is provided in the side surface of the housing, the chamber 13a is provided between the inlet port 21a and the duct 13b and a dustproof effect can be obtained by using the reduction of the flow velocity of the air.

Similar to the first embodiment, this embodiment is suitable for such a projector in which it is difficult to provide the inlet port 21a under the projection lens barrel 5 on the housing's bottom surface or to provide a large chamber 13a in the longitudinal direction on the side of the projection lens barrel 5.

Figure 10:
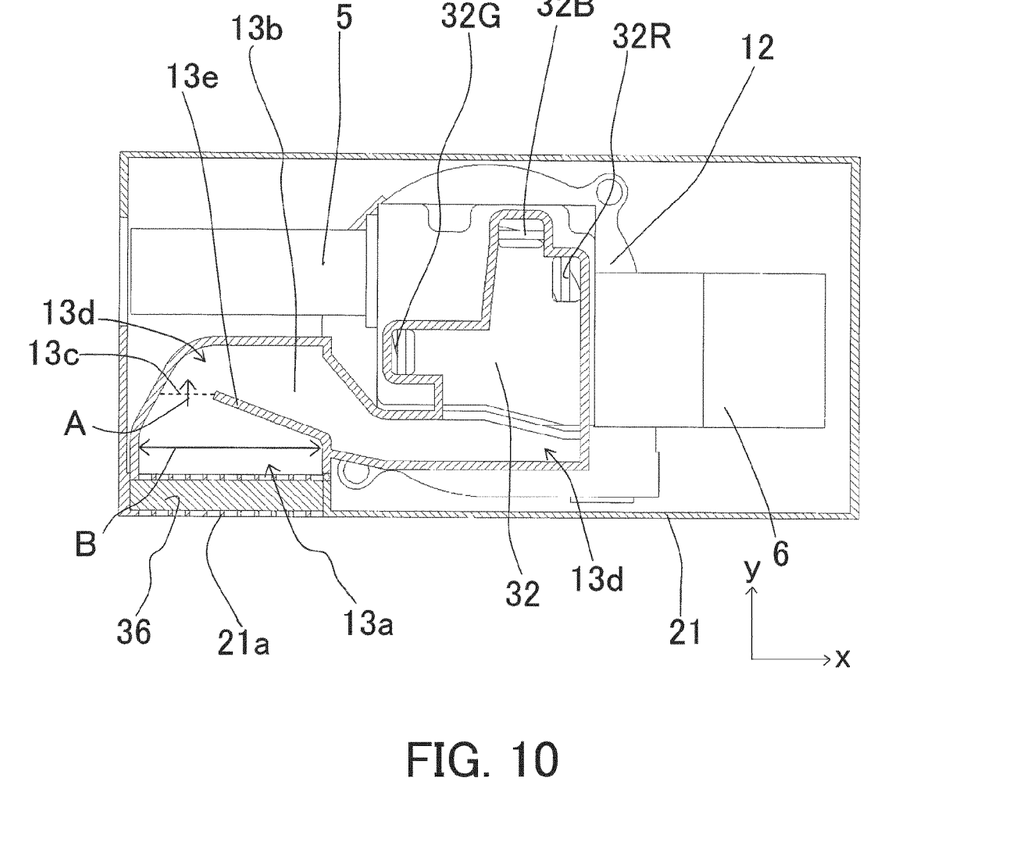
FIG. 10 is a schematic view of a cooling structure in a projector according to a third embodiment of the present invention.

FIG. 10 schematically shows a shape of the chamber 13a, and a sectional area relationship between the chamber 13a and the duct 13b in the B direction in a projector according to the third embodiment of the present invention.

Those elements in this embodiment, which are common or have the common functions to the first embodiment, are designated by the same reference numerals of the first embodiment.

Even in this embodiment, the sectional area of the chamber 13a at the connection part 13c between the chamber 13a and the duct 13b in the B direction orthogonal to the inflow direction (arrow A direction) of the air into the duct 13b is set larger than the sectional area of the connection part 13c. The maximum sectional area of the chamber 13a can be set twice as large as the sectional area of the connection part 13c.

When part of the air that has passed the inlet port 21a and the dust removal filter 36 directly flows in the duct 13b, the part of the air is not affected by the flow velocity reduction effect by the chamber 13a and maintains a high flow velocity. Thereby, there is a region outside the inlet port 21a in which the air flows toward the inlet port 21a, and an amount of dust infiltrating from the inlet port 21a increases.

In order to avoid this phenomenon, the embodiment provides to the chamber 13a (or the space between the inlet port 21a and the duct 13b) a resistance plate 13e as a resistance part configured to lower the flow velocity of the part of the air that passes the inlet port 21a and the dust removal filter 36. When the resistance plate 13e is provided, the flow velocity of the air that passes the whole of the inlet port 21a and the dust removal filter 36 can be made uniform. The term "uniform" means not only perfectly equal (uniform) but also more uniform than a case where there is no resistance plate 13e.

In addition, when the resistance plate 13e is provided, an entrance (connection part 13c) of the duct 13b is located opposite to the inlet port 21a with respect to the chamber 13a. Therefore, all of the air that has passed the inlet port 21a and the dust removal filter 36 passes the chamber 13a, and undergoes the flow velocity reduction operation. Therefore, most of the dust that has passed the dust removal filter 36 can be limited in the chamber 13a, and can be prevented from infiltrating into the duct 13b.

The resistance plate 13e can be a wall that determines such a flow direction that part of the air that has passed the inlet port 21a and the dust removal filter 36 can be guided and pass the chamber 13a.

The air whose flow velocity has reduced at the chamber 13a then flows in the duct 13b. Since the sectional area of the duct 13b in the B direction is smaller than that of the chamber 13a in the B direction, the flow velocity of the air that flows in the duct 13b is higher than the flow velocity in the chamber 13a. The air in the duct 13b flows in the optical box 6 through the openings 32G, 32B, and 32R. The duct 13b is provided with a plurality of bent portions 13d, and the dust that has entered the duct 13b can be adhered to the wall surfaces of the bent portions 13d.

The air that flows in the optical box 6 flows around the optical elements, such as a reflective liquid crystal panel 61 and the quarter waveplate 62, at a high speed, efficiently cools these optical elements, and is exhausted to the outside of the optical box 6 through the optical system cooling fan 12.

Similar to the first embodiment, this embodiment is suitable for a projector in which it is difficult to provide the inlet port 21a under the projection lens barrel 5 on the housing's bottom surface or to provide a large chamber 13a in the longitudinal direction on the side of the projection lens barrel 5.

In addition, since the air flow direction changes at the first bent portion 13d that is located just after the air flows in the duct 13b from the chamber 13a in this embodiment, the bent portion 13d appears to act as resistance to the air flow. However, the air has a low flow velocity just after it flows in the duct 13b from the chamber 13a, and the influence of the resistance increase caused by the fluctuation of the flow direction is small.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-013566, filed on Jan. 24, 2008, which is hereby incorporated by reference herein in its entirety.

What is claimed is:

1. An image projection apparatus that illuminates an image forming element configured to form an original image by using light form a light source, and projects light from the image forming element onto a projection screen separate from the image projection apparatus, the image projection apparatus comprising:
   a housing having an inlet port including a dust removal filter;
   a fan arranged downstream of the image forming element and configured to draw air into the housing through the inlet port;
   a duct configured to lead the air drawn from the inlet port into a space that contains the image forming element; and
   a chamber provided between the inlet port and the duct,
   wherein a sectional area of the chamber is larger in a direction orthogonal to an inflow direction of air into the duct at a connection part between the chamber and the duct than a sectional area of the connection part.

2. The image projection apparatus according to claim 1, wherein the sectional area of the chamber is twice as large as the sectional area of the connection part.

3. The image projection apparatus according to claim 1, wherein the chamber has a resistance part configured to make uniform a flow velocity of the air by reducing a flow velocity of part of the air which passes the inlet port.

4. The image projection apparatus according to claim 1, wherein the chamber has a dust capturer configured to capture dust.

5. The image projection apparatus according to claim 1, wherein the duct includes a bent portion.

6. The image projection apparatus according to claim 1, wherein the duct is connected to the image forming element in a long side direction relative to a space that contains the image forming element.

7. An image projection apparatus that illuminates an image forming element configured to form an original image by using light form a light source, and projects light from the image forming element onto a projection screen separate from the image projection apparatus, the image projection apparatus comprising:
   a housing having an inlet port including a dust removal filter;
   a fan arranged downstream of the image forming element and configured to draw air into the housing through the inlet port;
   a duct configured to lead the air drawn from the inlet port into a space that contains the image forming element;
   a chamber provided between the inlet port and the duct; and
   a resistance part provided between the inlet port and the duct, and configured to make uniform a flow velocity of the air by reducing a flow velocity of part of the air which passes the inlet port.

8. An image projection apparatus that projects light from an image forming element onto a projection screen separate from the image projection apparatus, the image projection apparatus comprising:
   a housing having an inlet port;
   a fan arranged downstream of the image forming element and configured to draw air into the housing through the inlet port;
   a duct configured to lead the air drawn from the inlet port into a space that contains the image forming element; and
   a chamber provided between the inlet port and the duct,
   wherein a sectional area of the chamber is larger in a direction orthogonal to an inflow direction of air into the duct at a connection part between the chamber and the duct than a sectional area of the connection part.

9. An image projection apparatus that projects light from an image forming element onto a projection screen separate from the image projection apparatus, the image projection apparatus comprising:
   a housing having an inlet port;
   a fan arranged downstream of the image forming element and configured to draw air into the housing through the inlet port;
   a duct configured to lead the air drawn from the inlet port into a space that contains the image forming element;
   a chamber provided between the inlet port and the duct; and
   a resistance part provided between the inlet port and the duct, and configured to make uniform a flow velocity of the air by reducing a flow velocity of part of the air which passes the inlet port.

10. An image display system comprising:
   the image projection apparatus according to claim 1; and
   an image supply apparatus configured to supply image data to the image projection apparatus.

11. An image display system comprising:
   the image projection apparatus according to claim 7; and
   an image supply apparatus configured to supply image data to the image projection apparatus.

12. An image display system comprising:
   the image projection apparatus according to claim 8; and
   an image supply apparatus configured to supply image data to the image projection apparatus.

13. An image display system comprising:
   the image projection apparatus according to claim 9; and
   an image supply apparatus configured to supply image data to the image projection apparatus.

* * * * *